W. M. LOGSDON & J. DUNBAR.
STOCK AND POULTRY FEEDER.
APPLICATION FILED MAY 3, 1911.
1,049,111.
Patented Dec. 31, 1912.
2 SHEETS—SHEET 1.
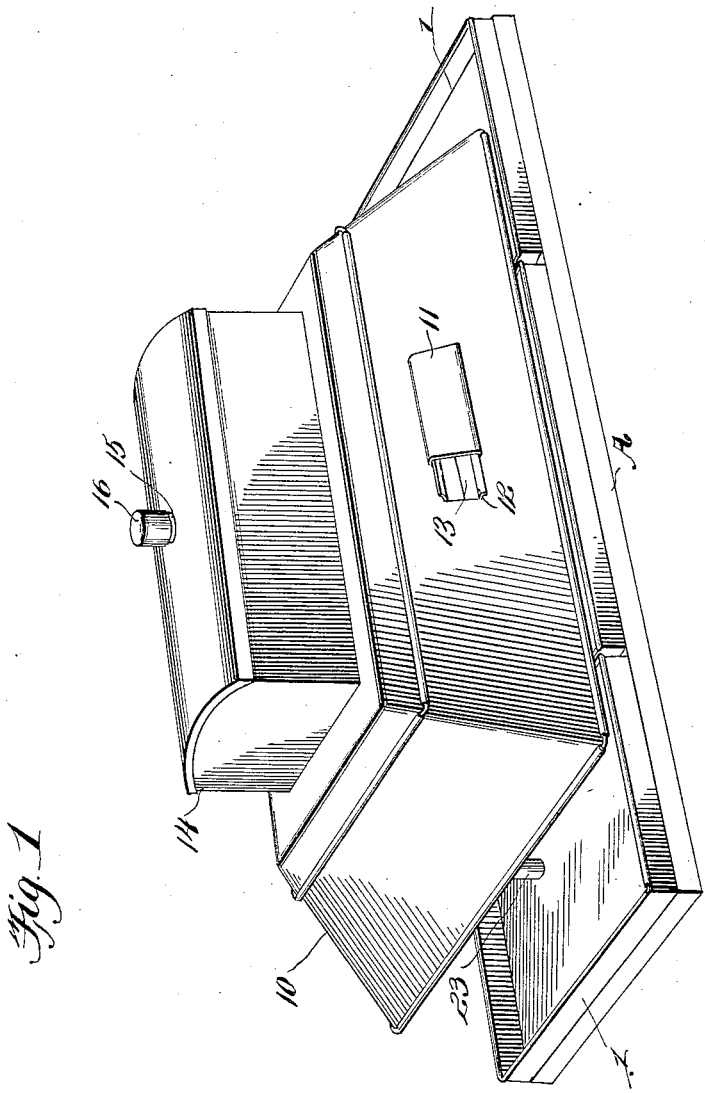

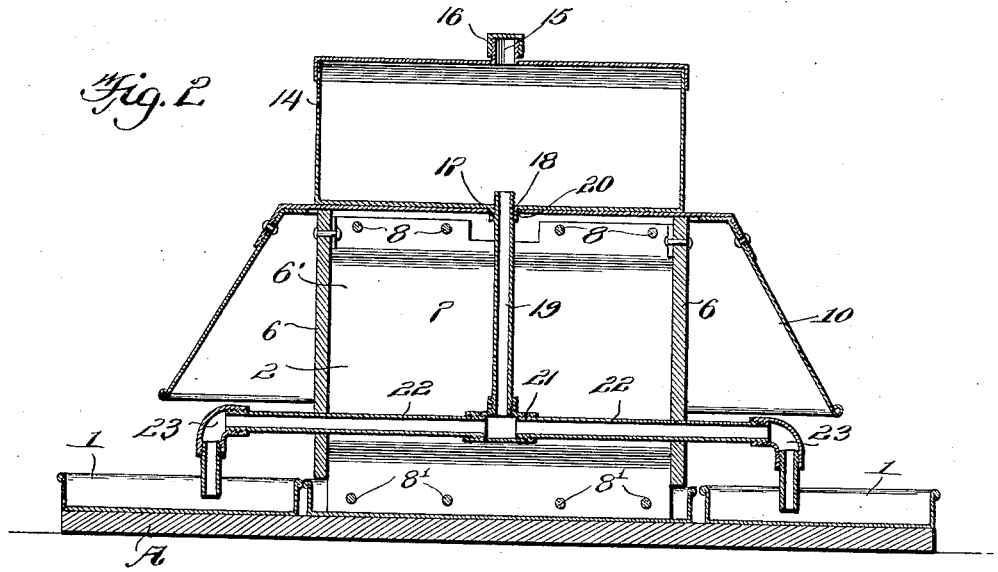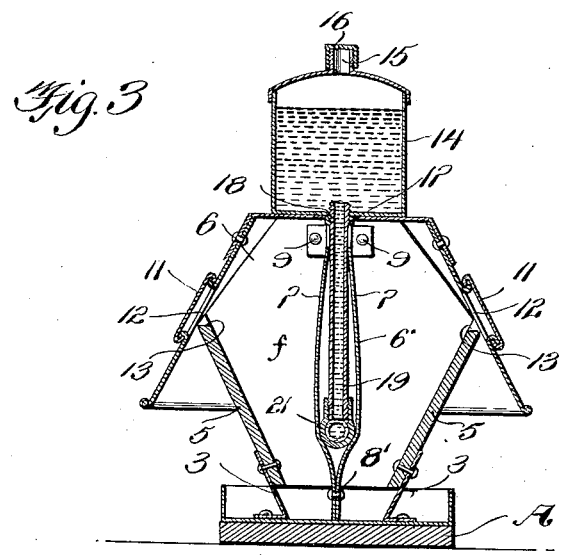

UNITED STATES PATENT OFFICE.

WILLIAM M. LOGSDON AND JESSE DUNBAR, OF COOPERSTOWN, ILLINOIS.

STOCK AND POULTRY FEEDER.

1,049,111.

Specification of Letters Patent.

Patented Dec. 31, 1912.

Application filed May 3, 1911. Serial No. 624,710.

*To all whom it may concern:*

Be it known that we, WILLIAM M. LOGSDON and JESSE DUNBAR, citizens of the United States, residing at Cooperstown, in the county of Brown and State of Illinois, have invented new and useful Improvements in Stock and Poultry Feeders, of which the following is a specification.

This invention relates to certain novel and useful improvements in a feeding device adapted especially for use in feeding and watering stock and poultry.

In carrying out our invention it is our purpose to provide a structure of the class referred to which will embody means whereby food may be fed into convenient troughs and whereby water may be conducted from a suitable reservoir to a point of consumption.

It is also our purpose to provide a combination feeder, and fountain or watering device, wherein the feed is prevented from clogging or packing, when moist, and wherein the food will be readily conducted from the storage compartments to the feel troughs as the requirements may demand.

Still a further object of our invention is to provide a structure wherein the water is conducted from a reservoir, suitably mounted upon the frame of our device, to receptacles arranged adjacent to the feed troughs, and in such position that they are readily accessible to the animals or poultry.

We also aim to provide a device of the class described embodying in its construction the desired features of simplicity, cheapness, and convenience.

With the above recited objects and others of a similar nature in view, our invention consists in the construction, combination and arrangement of parts set forth in and for and within the scope of the appended claims.

Referring now to the drawings in detail: Figure 1 is a perspective view of a structure embodying our invention. Fig. 2 is a longitudinal section of the same. Fig. 3 is a cross sectional view.

Referring now to the accompanying drawings in detail, the letter A designates the base of our improved feeder, which may be of any size, form or dimension, depending upon the quantity of food and water to be supplied. If the feeder is to be constructed as a stock feeder it will, of course, be made of relatively greater size than if the invention is to be embodied in a poultry feeder. Located at each end of the base is a water pan 1, for receiving the water to be supplied to the stock or poultry, as hereinafter described, while arranged intermediate these pans and also carried by the base, is a feed receptacle or trough indicated as an entirety by the numeral 2. Extending upwardly from the base, and within the feed receptacle or trough, are the four outwardly diverging legs 3, designed to support the feed bin *f*. This bin is formed with downwardly and inwardly inclined sides 5, which are connected to the legs and terminate a short distance above the base of the feed trough. The ends of the bin are shown at 6, the upper portions of said ends extending upward beyond the upper edges of the sides. The feed bin is divided into two compartments by means of the double wall 6′ extending centrally and longitudinally of the bin. This wall is preferably formed of two vertical plates 7, 7, of metal or other suitable material, bolted together, as at 8 along the upper edges thereof, said plates being bowed or bent outwardly and at their lower ends, which extend to or contact with the base of the feed trough, these plates are connected through bolts or other means, as shown at 8′, the ends of the plates being bent outwardly and secured to the end walls of the bin as at 9.

The numeral 10 designates the roof or covering of the structure, and in the present instance is shown as frusto-pyramidal in form, although it will be understood that this roof may be of any preferred form, and made of any suitable material, preferably sheet metal, galvanized metal or the like. The roof or covering, which as shown flares or broadens outwardly, is designed to removably rest upon the ends of the feed bin with the sides and ends of said roof flaring beyond the sides and ends of the said bin. The longitudinally outwardly flared sides of the roof are provided with sliding doors 11 covering rectangular openings 12, which openings aline with the cut away or recessed portions 13 in the top of the edges of the side wall of the feed bin, this being for the purpose of permitting a supply of food to be introduced into the compartments of the bin when necessary.

Mounted upon the top of the roof 10 is a water receptacle 14, in the present instance oblong in form, and also preferably formed of sheet metal, said receptacle having an inlet 15 through which the water will be introduced, said inlet being covered by the screw cap 16. The bottom of said receptacle is provided with a threaded neck 17 adapted to screw onto the threaded terminal 18 of the vertical water pipe 19, the top of the roof or covering 10 being cut away or apertured as at 20 to permit the end of the vertical pipe to project sufficiently to receive the threaded neck of the water receptacle. This vertical water pipe 19 extends downwardly within the feed receptacle, between the double walls of the vertical partition thereof, and at its lower end is provided with a T-coupling 21 to the ends of which are connected the oppositely disposed horizontally extending water pipes 22, terminating in the discharge elbows 23 which deliver the water to the water pans on the base. It will thus be seen that the water is conveyed from a reservoir on top of the structure, down through the feed receptacle, and thence to the water trough without interfering in any manner with the supplying of the food to the troughs, and at the same time the water pipes are protected from and concealed from view. It will also be seen that the water in the pans reaches a level up to the lower ends of the discharge pipes, and that the water in said pans is always maintained at this level so long as there is any water in the reservoir, as will be readily understood.

It will be noted that we have provided a simple compact and economical form of feeder which may be adapted for use for poultry, or for stock, and one which may be manufactured and sold at a comparatively low cost. Furthermore, in our improved feeder the clogging or packing of the food is prevented, as the same will flow down the inclined sides of the feed receptacle, to the feed trough, and will be automatically supplied to the latter in the desired quantities, so that the trough will be replenished according to the amount of food taken therefrom. It will also be seen that the pipes of the water supply are arranged to obtain a positive and direct feed, and at the same time are housed in such way as to be protected against severe weather.

By employing the inclined or overhanging roof, the poultry or stock are prevented from having free access to the supply of food in the bin but must feed from the trough.

While we have herein shown and described one particular embodiment of our invention, we wish it to be understood that we do not limit ourselves to all the precise details of construction, which are herein set forth, by way of illustration, as modifications and variations may be made without departing from the spirit of the invention or exceeding the scope of the appended claims.

Having thus described the invention, what is claimed as new is:

1. A device of the class described comprising a base, a feed trough on the base, a water pan at each side of the feed trough, a feed bin mounted above the trough and in open communication therewith, a partition arranged longitudinally of the feed bin and dividing the same into compartments and composed of two plates having portions spaced apart, a water conduit disposed between the spaced portions of the partition and leading to the said pans, and a water reservoir removably mounted above the feed trough and connected to said conduit.

2. A device of the class described comprising a feed trough, water pans located at each side of the trough, a feed bin mounted above the trough and composed of end walls and side walls, the end walls being of a height greater than the side walls, a cover substantially inclosing said bin and supported by the end walls thereof and removable therefrom, a partition dividing said bin into compartments and composed of two plates having portions spaced apart, a water conduit disposed between the spaced portions of the plates and leading to said pans, and a water receptacle removably mounted upon the roof and connected to said conduit.

In testimony whereof we affix our signatures in presence of two witnesses.

WILLIAM M. LOGSDON.
JESSE DUNBAR.

Witnesses:
C. A. REID,
G. A. MOODY.

Copies of this patent may be obtained for five cents each, by addressing the " Commissioner of Patents, Washington, D. C."